United States Patent
Kolaxis et al.

(10) Patent No.: US 12,316,806 B2
(45) Date of Patent: May 27, 2025

(54) COMPUTER-IMPLEMENTED METHOD AND SYSTEM FOR RESPONSE TIME REDUCTION IN EMERGENCY INCIDENT EVENTS

(71) Applicant: ATOS Public Safety, LLC, Irving, TX (US)

(72) Inventors: Ioannis Kolaxis, Athens (GR); Gavriil Papadopoulos, Athens (GR)

(73) Assignee: ATOS Public Safety, LLC, Irving, TX (US)

( * ) Notice: Subject to any disclaimer, the term of this patent is extended or adjusted under 35 U.S.C. 154(b) by 291 days.

(21) Appl. No.: 18/171,705

(22) Filed: Feb. 21, 2023

(65) Prior Publication Data
US 2024/0022663 A1 Jan. 18, 2024

(30) Foreign Application Priority Data
Jul. 15, 2022 (EP) .................................. 22185300

(51) Int. Cl.
*H04M 11/04* (2006.01)
*G10L 15/08* (2006.01)
*G10L 15/22* (2006.01)
*H04M 3/51* (2006.01)

(52) U.S. Cl.
CPC .......... *H04M 3/5116* (2013.01); *G10L 15/08* (2013.01); *G10L 15/22* (2013.01); *H04M 3/5183* (2013.01); *G10L 2015/088* (2013.01)

(58) Field of Classification Search
CPC ... H04M 3/5116; H04M 3/5183; G10L 15/08; G10L 15/22
See application file for complete search history.

(56) References Cited

U.S. PATENT DOCUMENTS

| | | | | |
|---|---|---|---|---|
| 11,218,862 | B1* | 1/2022 | Ma | H04M 3/5166 |
| 11,558,728 | B2* | 1/2023 | Pellegrini | H04L 67/52 |
| 12,126,762 | B2* | 10/2024 | Mrowiec | H04M 3/2281 |
| 2021/0385638 | A1 | 12/2021 | Stawiszynski et al. | |
| 2022/0201547 | A1* | 6/2022 | Gupta | H04W 4/90 |
| 2023/0196903 | A1* | 6/2023 | Doutre | G08B 13/196 |
| | | | | 455/404.1 |

OTHER PUBLICATIONS

Extended European Search Report for European Application No. 22185300.5 dated Dec. 19, 2022.

* cited by examiner

*Primary Examiner* — Simon King
(74) *Attorney, Agent, or Firm* — MEAGHER EMANUEL LAKS GOLDBERG & LIAO LLP (57) ABSTRACT

A computer-implemented method and system for response-time-reduction in emergency incident events can include an artificial intelligent agent (AI Agent) that can monitor an emergency environment in real-time upon an occurrence or change in one or more emergency incident information values. The AI Agent can analyze if one or more emergency incident information values occurs and/or reaches across one or more predefined thresholds. One or more first responders can then be automatically dispatched if the analysis has shown that this is necessary. The AI Agent can be rewarded based on its performance of monitoring and/or dispatching and can adjust the one or more predefined thresholds according to the reward.

16 Claims, 3 Drawing Sheets

COMPUTER-IMPLEMENTED METHOD AND SYSTEM FOR RESPONSE TIME REDUCTION IN EMERGENCY INCIDENT EVENTS

CROSS-REFERENCE TO RELATED APPLICATIONS

The present application claims priority to European Patent Application No. EP 22 185 300.5 filed on Jul. 15, 2022. The entirety of this European Patent application is incorporated by reference herein.

FIELD

The present invention relates to a computer-implemented method and a system for response-time-reduction in emergency incident events.

BACKGROUND

The current trend in public safety is the Next Generation of Emergency Systems, known as NG9-1-1/NG1-1-2. In essence, it is a technology that allows the public to share richer, more 20 detailed data (e.g. videos, images, texts) with emergency call centers and the call operators. It also enhances the ability of emergency call centers to communicate with each other and improves system resiliency.

SUMMARY

Currently, in most cases a call operator for an emergency system can have some computer-based assistance, but not in the field of drastically reducing the response time of the emergency responders. Especially in cases where the calls need to be directed towards a waiting queue, valuable info might be delayed being transferred to the responders.

When an emergency event occurs, there is often a call flow towards the emergency call operators. Sometimes, this call flow is manageable by the call operators and sometimes, especially in major catastrophic events like earthquakes, massive fires, terrorist attacks, car crash pileups, flooding or airplane disasters it is not manageable, and this forces some calls to enter a waiting queue, before they are serviced by the call operator. In both cases, there is a precious time interval between the information processed by the call operator and the passing of this information to the emergency departments that will dispatch the appropriate forces (e.g. personnel, units, and vehicles). Therefore, in many circumstances, the call operators can't have an overall situation awareness and that can lead to a delay in informing the suitable emergency departments that need to be involved. Therefore, first responders might lose precious time and that can make the difference between life and death.

The Next Generation of 9-1-1/1-1-2 systems can allow for relatively seamless information sharing about emergency incidents between call centers, first responders, trauma centers and other emergency response entities. However, all the existing solutions we are aware of rely on the call takers answering the emergency calls and asking for information from the callers, for example, who are the individuals involved in an emergency incident or who are witnesses of such incidence. In cases where a major incident occurs, there is a vast number of calls towards the 9-1-1/1-1-2 operators or call takers resulting in calls being placed at a queue waiting to be answered. Depending on the severity and the extent of the event, the calls might stay in the queue for a long time before they are answered. While these calls are waiting, the emergency services may be unaware of the emergency incident waiting to be reported, having no information to share or to act upon.

There are existing solutions, that are tackling some aspects automatically, and by using some text transcription technologies, or an algorithm to handle the calls placed in queue. But all those are functioning as assisting technologies to the call operator without using any machine learning techniques that will allow them to evolve and help towards the best handling of an emergency event. There is currently no process of handling an emergency call (either live call or call on hold) by using a machine learning algorithm, that would be able to provide essential information to the first responders before they converse with the call operator.

Therefore, embodiments of the present invention can be configured to provide a computer-implemented method and a corresponding system for response-time-reduction in emergency incident events. Embodiments can also be configured to automatically dispatch first responders to an identified emergency scene.

A computer-implemented method for response-time-reduction in emergency incident events can be provided. The method can include monitoring, by an artificial intelligent (AI) agent (which may also be referred as an artificial intelligence agent or AI agent), an emergency environment in real-time upon an occurrence or change in at least one emergency incident information value. The AI agent can then analyze if the at least one emergency incident information value occurs and/or reaches across one or more predefined thresholds. The AI agent can also ad-hoc dispatch one or more first responders if the analysis has shown that this is necessary. The method can also include rewarding, by the emergency environment, the AI agent on the performance of the monitoring and/or the ad-hoc dispatching; and adjusting, by the AI agent, the one or more predefined thresholds according to the reward.

Embodiments can be configured so that the response time is defined as the period that is needed from the moment that someone calls the emergency services until the arrival of the first responders at the emergency scene to provide help.

In some situations, the response time can be increased drastically (e.g., in cases where a major catastrophic event occurs such as an earthquake, a car crash pileup, a shooting attack, an airplane crash, etc.), where the emergency service call centers become congestive due to the high number of calls, and the calls are placed in a waiting queue. In this case, precious information might also be lost, because the relevant calls that would supply the call operators with this information, might not be able to converse with him/her immediately.

As soon as a call is placed towards an emergency call center and its operator (also called call takers or agents), an AI agent (which can also be called a pre-defined AI algorithm) starts in the background of the call. The AI algorithm can leverage Reinforcement Learning (RL) to decide how to distribute incoming emergency calls more effectively, by distributing some of the calls directly to one or more first responders, thus bypassing the one or more call takers so that the response time is reduced.

RL can be an area of machine learning concerned with how intelligent agents ought to take actions in an environment to maximize the notion of cumulative reward. RL is one of three basic machine learning paradigms, alongside supervised learning, and unsupervised learning.

RL differs from supervised learning in not needing labelled input/output pairs be presented, and in not needing sub-optimal actions to be explicitly corrected. Instead, the focus is on finding a balance between exploration (of uncharted territory) and exploitation (of current knowledge). Partially supervised RL algorithms can combine the advantages of supervised and RL algorithms.

The environment is typically stated in the form of a Markov decision process (MDP) because many RL algorithms for this context use dynamic programming techniques. The main difference between the classical dynamic programming methods and RL algorithms is that the latter do not assume knowledge of an exact mathematical model of the MDP, and they target large MDPs where exact methods become infeasible.

The environment can be defined as:
i. The emergency call takers.
ii. The emergency responders.
iii. An emergency call center, where all the emergency calls arrive and are handled by the emergency call takers.
iv. An information system tracking the position of all the emergency responders and the emergency incident that they may be responding to.

The artificial intelligence agent (AI agent) can be a Reinforcement Learning (RL) algorithm which uses rewards and punishments as signals for positive and negative behavior. It will be developed and installed on a server (local or cloud) and will be part of the emergency call center.

According to a preferred embodiment of the method, the step of monitoring the emergency environment comprises identifying, by the AI agent, all incoming calls, queued calls and/or media data of one or more callers in one or more emergency call centers and/or wherein the emergency environment further comprises identifying, by the AI agent, the location and/or the type of the incoming calls, queued calls and/or the media data.

Thereby, the call center can be a Public Safety Answering Point (PSAP) or any other Next Generation entity able to receive and answer emergency calls. The PSAP or other entity can be a communication device or computer device that includes at least one processor connected to a non-transitory memory and at least one transceiver or interface. Embodiments can also include at least one input device (e.g. keyboard, mouse, keypad, touch screen, etc.), at least one output device (e.g. display, touch screen, printer, etc.) and/or at least one input/output device (e.g. touch screen display) connected to the processor. The PSAP or other device can be configured to communication with other elements of an emergency system (e.g. components of an emergency system network, an Emergency Services IP Network (ESInet), an Emergency Selective Routing Proxy (ESRP), a call server, a private branch exchange (PBX), and/or other communication elements of at least one network. The communication device or computer device can be configured so that under the location of the incoming calls, queued calls and/or media data, the geological position of these calls/data is understood. The exact location of the call/data can either be based on the antenna broadcasting data or on GPS. By type is understood in which way the calls or data were transmitted, e.g. from a mobile or from a landline/fixed phone. Media data can refer to all data sources other than classic phone calls such as video and audio streams, text or image messages, and maps with locations, etc.

According to another preferred embodiment of the method, the step of monitoring the emergency environment comprises clustering, by the artificial intelligent agent, several calls from a specific location or a sub-location and/or rating, by the artificial agent, several calls which are used to give information about the scale of an incident. Clustering of calls can, for example, take place for certain locations where there is a higher crime rate or where there is a permanent increased traffic volume etc. Rating several calls can reveal, for example, a more and/or quicker flow of calls which means a bigger urgency for first responders.

According to another preferred embodiment of the method, the clustering comprises automatically setting, by the AI agent, a radius determining the special location according to at least one of a predefined incident identification, an accessibility for rescue forces, a network coverage in mobile and/or wired call networks, a geophysical location, a road and street network, a traffic volume, an occurrence of an event and/or a weather event.

A predefined incident identification can be, for example, a car crash, a shooting incident, an explosion, or any other emergency incident. For a car crash a radius of 50 m to 200 m may be set while for a shooting or an explosion a radius of about 500 m to one or more km may be set. Further, the AI agent can set these metrics higher or lower if, for example, the call or data analysis shows that the shooting is shifting or expanding. Furthermore, the AI agent can take other events at certain locations into account when determining the radius such as weather, scheduled events such as concerts or sporting events, geographical conditions such as a steep gradient, or network coverage in the mobile network.

According to still another preferred embodiment of the method, the step of analyzing the monitored emergency environment further comprising identifying, by the AI agent, keywords or key noises in the ambient noise from the one or more caller whose call is waiting in a queue and matching identified keywords and/or key noises to predefined keywords and/or predefined key noises. Such predefined key noises can be, for example, the sound of gunshots, explosions or people screaming. Predetermined keywords to be considered can be, for example, robbery, help, bomb, terrorist, car crash, fire etc.

According to yet another preferred embodiment of the method, the step of analyzing the monitored emergency environment further comprises prompting, by the AI agent, one or more caller whose call is waiting in the queue, to give a description of the emergency incident to the AI agent and/or scanning, by the AI agent, a conversation or a report from one or more caller who is giving a description of the emergency incident for specific keywords and/or key noises. The AI agent can be designed as a chatbot to interact with the one or more caller. It is also possible that a predefined list of questions about emergency incidents is asked by the AI agent to the one or more caller, who then can answer them. Thus, for example, the type of incident, the location, the number of injured persons, etc. can be recorded. At the same time or shortly thereafter, the AI agent can search and analyze the conversation or the purely conversational report for specific keywords.

Action-delay can refer to a certain type of delayed action activity. For instance, in the case of a terrorist attack, there might be a building that is set on fire (e.g. by an explosion), but the calls initiated to report this can be placed in the waiting queue due to heavy call traffic. Consequently, this means that there will be a delay to inform the fire brigade, although it was needed in the first place. By scanning the conversations or reports, the AI agent can get an accurate picture of the situation much faster and can act accordingly which, of course, shortens the time in which the one or more first responder arrives at the accident/scene.

According to yet another preferred embodiment of the method, the step of monitoring the emergency environment comprises using, by the AI agent, a speech-to-text analysis to create a transcript of the description of the emergency incident that the one or more caller gives to identify several keywords. Thereby, the AI agent also further analyzes numbers mentioned in relation to specific keywords, e.g. number of people seen, number of vehicles involved in the incident, etc.

According to another preferred embodiment of the method, the step of analyzing the monitored emergency environment comprises identifying, by the AI agent, the number of calls in the queue and/or the waiting time for each call in the queue to be answered.

According to still another preferred embodiment of the method, the step of analyzing the monitored emergency environment comprises identifying, by the AI agent, the call status of the one or more call taker in the call center and/or the status of each of the one or more first responder. A call status can include a busy/available signal or status. Embodiments can be configured to analyze the state of exhaustion or the mental and/or physical stress of the one or more call taker and/or first responder in order to select the teams that are best suited for the mission.

Further, according to a preferred embodiment of the method, the step of ad-hoc dispatching comprises sending, by the AI agent, a message with all necessary information to each of the appropriate one or more first responder that need to be involved in the emergency incident. A message can refer to any kind of message that is suitable to inform the one or more first responder, e.g. this can be in the form of a text message, a preconfigured voice notification or in any other conceivable way of messaging.

According to yet another preferred embodiment of the method, the step of ad-hoc dispatching comprises simultaneous dispatching, by the AI agent, of different first responders and/or different emergency departments. This is especially beneficial when dealing with a large-scale critical event where multiple calls are received simultaneously, such as an earthquake, a car crash pileup, a shooting, a plane crash, etc. For example, in a shooting attack at a university, the calls towards the emergency system might refer to people who are threatened by someone using a gun and is taking hostages, transferring the information between different departments is critical. In this case the AI agent can inform the police, the fire brigade and/or a special operations unit (e.g. a special weapons and tactics-SWAT-unit) simultaneously, thereby saving an incredible amount of time.

According to yet another preferred embodiment of the method, the step of analyzing the monitored emergency environment comprises automatically prompting, by the AI agent, the one or more caller and/or automatically scanning, by the AI agent, ongoing conversations, reports of conversations and/or ambient noise of calls in the queue upon keywords and/or key noises, if there are minimum of N calls waiting in a queue to be answered from the same area and on the same time. As an example, the minimum of N calls waiting in the queue to be answered can be set to be 20 calls, preferably 10 and particularly preferably 5. If the minimum number of calls in the queue is exceeded, the AI agent will automatically scan for specific words, e.g., fire, shooter, earthquake, airplane crash, boat sinking etc. in conversations, reports, or ambient noise of calls in the queue.

Further, according to a preferred embodiment of the method, the step of analyzing the monitored emergency environment comprises identifying, by the AI agent, an area or building with precedence in combination with a specific keyword or key noise, then the AI agent proceeds with ad-hoc dispatching of the first responders or emergency departments which are necessary according to the identified area or building with precedence in combination with the specific keyword or key noise, without waiting for more calls to converse with the AI agent and without further information about the emergency incident. Buildings or areas with precedence like universities, schools, government buildings, malls, public institutions etc. where many people gather, can have a bigger precedence. For example, this means that in the case where all emergency lines are busy, and a single call from a university enters the queue, having the one or more caller reporting to the AI agent that there is an active shooter in the University, then the AI agent will proceed with the sending of the notification of all relevant one or more first responder or relevant emergency departments, without waiting for more calls to provide information about the incident. This process will cover even the most extreme of cases where, for example, a major car crash or pileup has happened outside a university, but at the same time there is an active shooter inside a university building, and both of these incidents (related or not) are reported from the same area.

According to yet another preferred embodiment of the method, the step of rewarding comprises measuring, by the artificial intelligent agent, the call waiting time until an incoming call is answered by the one or more call taker or the one or more first responder and/or measuring, by the artificial intelligent agent, the response time which is the time for first responders to arrive on the emergency incident scene.

The artificial intelligent agent can measure the performance of the emergency services, thereby using established methods to track one or more of the following metrics: call waiting time (time until an incoming call is answered by a call taker or a first responder) and/or response time (time for first responder(s) to arrive on the emergency scene). Clearly, a lower value in the above performance metrics indicates a better performance.

A system for response-time-reduction in emergency incident events is also provided, wherein the system can be adapted to perform the steps of the method for response-time-reduction in emergency incident events. Advantageously, the system can include an AI agent which can be located inside or outside the system but can be connected to it. The system can further comprise a call center or a Public Safety Answering Point (PSAP) that can accept incoming emergency calls with the help of its call taker and/or transfer the calls to queues. The AI agent has access to the call center, e.g. the AI agent can see and handle all calls. Further, the system can be advantageously configured to communicate with one or more first responder devices or emergency department devices to notify them simultaneously in case of an identified emergency.

According to yet another aspect of the present invention, a program element is provided that can be stored in a non-transitory computer readable medium so that the program element can be executed by a processor connected to the computer readable medium so that, when the program element is executed by a processor, the device of the processor can be adapted to carry out steps of the method for response-time-reduction in emergency incident events.

According to another aspect of the present invention, a computer-readable medium comprising program code is provided which when being executed by a processor is adapted to cause a device of the processor to carry out steps of the method for response-time-reduction in emergency incident events.

A non-transitory computer-readable medium may be a floppy disk, a hard disk, a USB (Universal Serial Bus) storage device, a RAM (Random Access Memory), a ROM (read only memory) or an EPROM (Erasable Programmable Read Only Memory). A computer readable medium may also be a data communication network, e.g. the Internet, which can include a server or other computer device positioned and configured to allow downloading of a program code onto another device (e.g. a smart phone, a laptop computer, an electronic tablet, a desktop personal computer, etc.).

It has also to be noted that aspects of the invention have been described with reference to different subject-matters. In particular, some aspects or embodiments have been described with reference to apparatus type claims whereas other aspects have been described with reference to method type claims. However, a person skilled in the art will gather from the above and the following description that, unless otherwise notified, in addition to any combination between features belonging to one type of subject-matter also any combination between features relating to different types of subject-matters is considered to be disclosed with this text. In particular, combinations between features relating to the apparatus type claims and features relating to the method type claims are considered to be disclosed.

Other details, objects, and advantages of a telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawings. It should be appreciated that like reference numbers can identify similar components.

REFERENCE NUMBERS USED IN THE DRAWINGS INCLUDE

10 artificial intelligent agent
20 emergency environment
30 first responder(s)
40 call center
41 queue
42 call taker
50 incoming calls
60 queued calls
70 media data
80 caller
S100-S500 Method step S100 to S500

DETAILED DESCRIPTION

Figure 1:
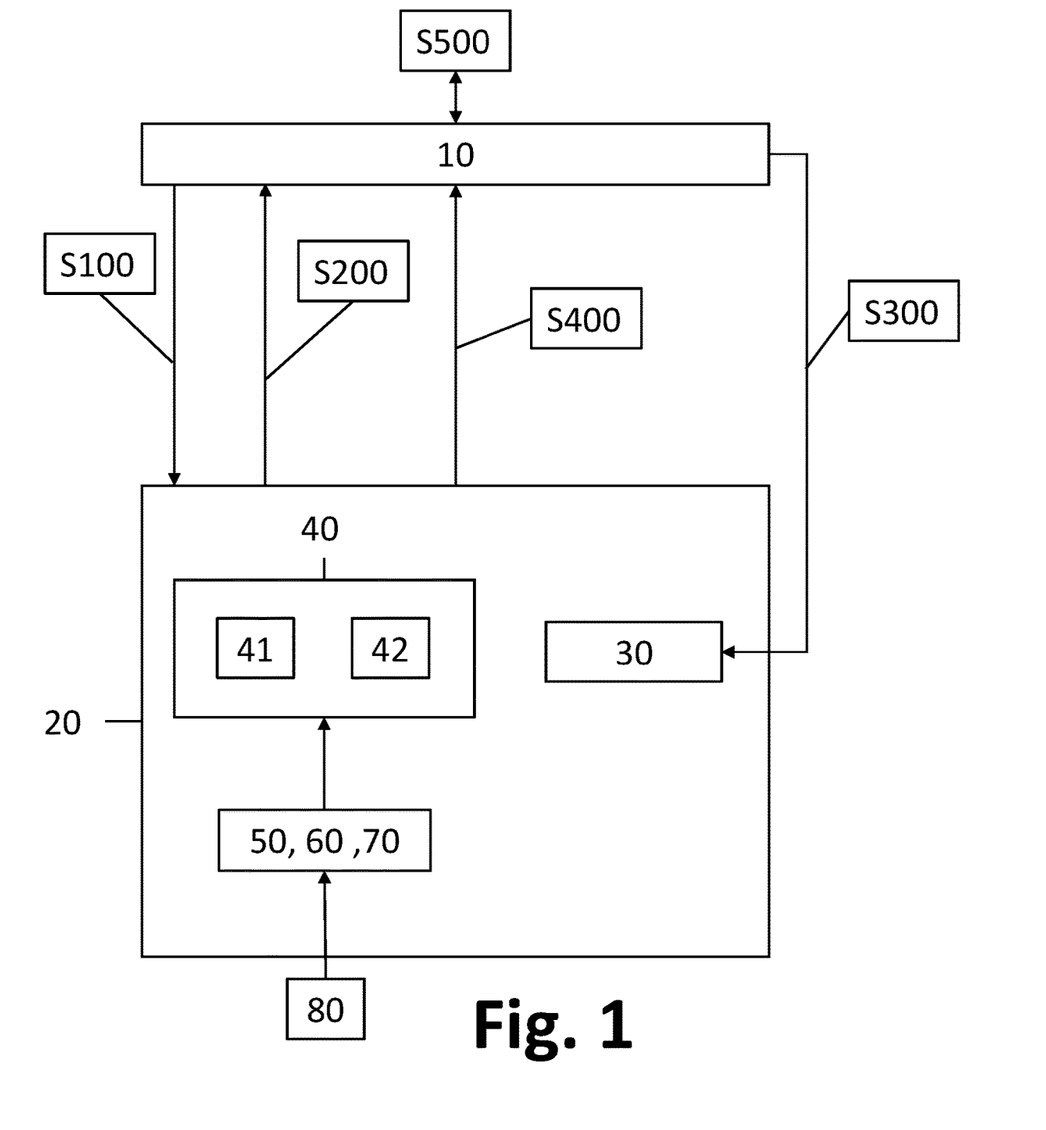
FIG. 1 shows in a schematic illustration an overview about the method steps for an exemplary method for response-time-reduction in emergency incident events according to an embodiment of the invention.

FIG. 1 schematically shows an overview of the method steps for response-time-reduction in emergency incident events according to an embodiment of the invention. As FIG. 1 shows, an artificial intelligence (AI) agent 10 can observe an emergency environment 20 in real-time. Thereby, the AI agent 10 can monitor, in a first step S100, different emergency incident information values such as incoming calls 50 to a call center 40, including several other values or attributes of each incoming call 50. The call center 40 can be a Public Safety Answering Point (PSAP). Values such as location and type of each incoming call can be monitored. The exact location of the call can either be based on the antenna broadcasting data or on a global positioning system (GPS) data. The type of each incoming call is the type of transmission of the call, e.g. from a mobile, from a landline/fixed phone.

Further values or attributes can be the number of calls from specific locations and/or the rate of incoming calls. The calls can be counted internally by the AI agent and can be clustered or categorized by location or even sub-location, to provide a better situational awareness to one or more first responder. Whereby, the rate of incoming calls can be used to give information about the scale of the incident, more and/or quicker flow of calls mean a bigger urgency for responders.

Further, all queued calls 60 in the call center 40, including various values or attributes of each queued call 60 such as location of each queued call 60, type of each queued call 60 (e.g. from a mobile, from a landline/fixed phone) can be additionally monitored by the AI agent. In a next step S200, the AI agent can analyze the calls waiting in the queue. The number of calls in the queue and the time the calls have already spent in the queue are considered notable values to monitor.

Furthermore, the AI agent can monitor media data 70 like media streams (video/audio streams), text/image/voice messages and the like which modern call centers can handle nowadays. These data can be analyzed by the AI agent using additional tools like image recognition, speech-to-text analysis etc.

The AI agent can either monitor the waiting calls or contact the callers directly, depending on how many calls are already on hold. When the AI agent monitors the calls, it looks for key noises or sounds within the call. Such key noises or sounds may represent, for example, gunshots from a gun, a call for help from a person, or the like. If the AI agent contacts the caller directly, this can be done in the form of a chatbot where the caller is asked to give a short description of the incident. However, it is also possible that a predefined list of questions such as: where did the accident happen, how many people are involved, what did exactly happen, etc. is already provided or queried by the AI agent acting as a chatbot. If keywords like fire, police, shooting or similar are mentioned in such a conversation or in such a description of the caller, the agent automatically evaluates this and compares, if the keyword is linked to other information like the number of injured persons or similar. The number of times a certain keyword is mentioned, the evaluation of the caller's voice for stress, as well as other values can be analyzed by the AI agent. It is also possible that different keywords are weighted differently so that, if a certain number of different keywords appears in the report of the caller, a predefined threshold is exceeded or not reached, the AI agent can then automatically initiate an ad-hoc distribution of first responders. Furthermore, the AI agent can also monitor the call status (available/busy) of each individual call taker or operator of a call center as well as the call status of the individual first responders to acquire knowledge about their availability.

If the analysis of step S200 reveals that it is necessary to send first responders 30 to an emergency incident scene, the AI agent 10 ad-hoc dispatches one or more first responder 30 in step S300. The AI agent 10 acts on the emergency environment 20 by deciding the precedence and the emergency level of an emergency incident and how to treat it, in terms of first responders 30 that need to be dispatched.

Therefore, the AI agent 10 will comprise a message with all the necessary information and distribute it to the relevant departments that need to be involved in the event. The message contents will inform the first responders 30 about the severity and the scale of the emergency incident, so that the relevant first responders 30 and their emergency departments will know quickly and before they converse with the call taker 42 in the call center 40, how many personnel and vehicles need to be dispatched to the incident scene. This means that time can be saved, and more details from the call takers 42 in the call center 40 can be obtained in the time between preparation and action.

The message sent by the algorithm underlying the AI agent 10 can be of different forms. One option would be to initiate a call (or send a text/voice message), including a pre-recorded message which will inform about the number of calls received from a specific location together with the major keywords parsed by the AI agent 10 and the total number of calls placed towards the emergency call system (the latter can be used to denote the potential scale of the event).

In the case where a caller 80 has provided video footage or images during his initial call, those images/video could be attached to the message sent by the AI agent to the various first responders 30 and their departments.

Another option would be that together with the message, the AI agent 10 can send a map of the area marked with bullets that will denote the exact location of every phone call received from the call takers/call operators 42 in the call center 40 or which has entered the waiting queue 41.

Depending on the AI agent 10, actions when and which calls to distribute to first responders 30, these actions will have an impact to the overall performance of the emergency services.

The emergency environment 20 can measure the performance of the emergency services, using established methods to track at least one or more of the following metrics: the call waiting time, defined as the time until an incoming call is answered by a call taker 42 or a first responder 30 and the response time, which is defined as the time for first responders 30 to arrive on the emergency scene after an emergency incident has been recognized as valid.

Clearly, a lower value in the above performance metrics indicates a better performance. After each action of the AI agent 10, in step S400 the emergency environment 20 rewards the AI agent 10, with either a negative or a positive reward. A negative reward if the performance of the emergency services deteriorates. The more the performance declines, the higher the negative reward will be. A positive reward if the performance of the emergency services improves or stays within an optimal range for the performance attributes/values being measured. Likewise, the positive reward will be higher as the performance improves, compared to a performance being stable in an optimal range.

At this point it is worth to mention, that a potential improvement would be that the AI agent 10 could handle the call location in a different way. The location could also be configured and defined based on the individual event. So, for example, if a car crash occurs, the exact location area can be set to a 100 m radius around the scene. But on the other hand, for a shooting incident or an explosion, the location can be set to a radius of 500 m, because it is more likely to be spotted in a greater distance.

A machine learning algorithm (AI agent) 10 can be able to process and assess many parameters simultaneously and will decide which emergency responder departments need to be informed before the first responders 30 converse with the call taker or operator 42, and how (by voice, video, text etc.). By utilization of an embodiment of our method, first responders 30 can already have a first idea of the incident and its scale and build a better situational awareness of the incident. The feedback from the responders 30, can be used as a reward (positive/negative) to the AI agent 10, and that will evolve it to even higher standards.

Then, after the reward was received, the AI agent 10 can adjust the one or more predefined thresholds according to the reward in step S500.

It should be appreciated that the AI Agent can be a computer device configured to run a pre-defined AI algorithm to function as the AI Agent. The computer device of the AI Agent can run code stored on a non-transitory computer readable medium that is communicatively connectable to a processor of the device of the AI Agent. The code can define the AI Agent and the functionality of the AI Agent. The computer device of the AI agent can also include other elements connected to the processor. These other elements can include at least one transceiver, at least one input device, at least one output device and/or at least one input/output device. The AI agent can be positioned for inranetwork communicative connections and/or internetwork communication connections via one or more networks as well.

Figure 2:
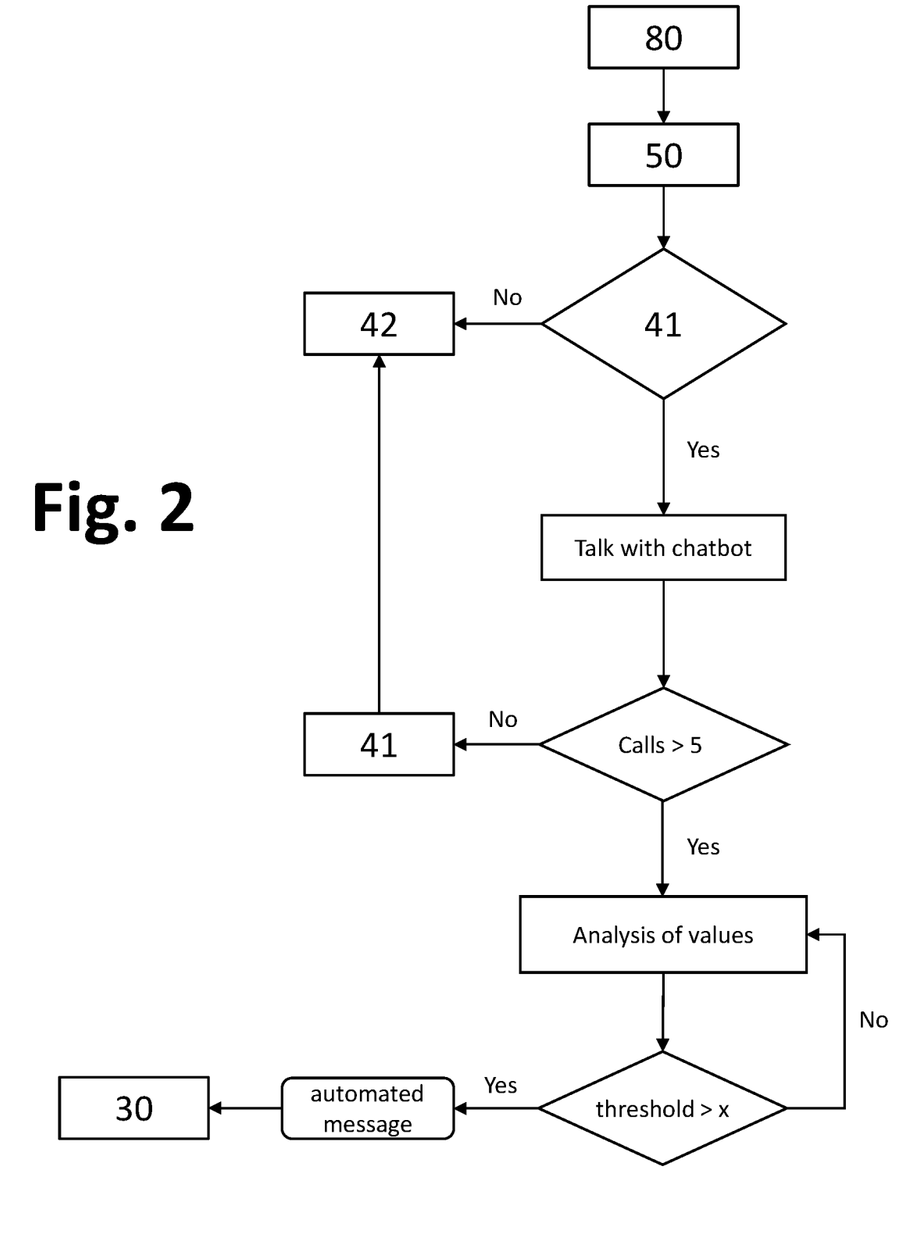
FIG. 2 shows a flowchart of an exemplary method for response-time-reduction in emergency incident events according to another embodiment of the invention.

FIG. 2 shows a flowchart of an exemplary method for response-time-reduction in emergency incident events according to another embodiment of the invention. In this embodiment, one or more calls 50 from one or more callers 80 arrives at an emergency call center. The AI agent can monitor whether the incoming calls 50 are directly forwarded to a call taker 42 of the call center or whether they are placed in a queue 41. If the calls are found in the queue 41, the AI agent as a chatbot can connect to the call and prompt the caller to give a description of the accident or any other emergency event (talk with chatbot). Afterwards, the call can be reassigned to a queue 41 in order to be still available for possible further inquiries by a call taker 42. However, as in this example, if more than 5 calls are waiting in the queue 41 or are asked by the chatbot for the description of the accident and these calls were assigned to a defined location or can be assigned to a location, the AI agent automatically begins to query the descriptions of the callers for keywords and other values. The AI agent compares the values of the different calls in the queue 41 and the descriptions given by the callers, and at the same time the calls made by the call center call takers for common or predefined keywords and/or other values. Each keyword can be assigned a predefined value beforehand—this also applies to other values such as the caller's stress level, etc. If the evaluation of the individual values exceeds a predefined threshold (threshold>x), the AI agent automatically initiates the dispatch of first responders. In this case, the AI agent can send an automated message to the first responders 30 or to the emergency departments, containing the most important information needed for the emergency response and for determining the appropriate resources. However, if the threshold is not exceeded, the evaluation can continue in the background, but no first responder 30 units may be dispatched.

Figure 3:
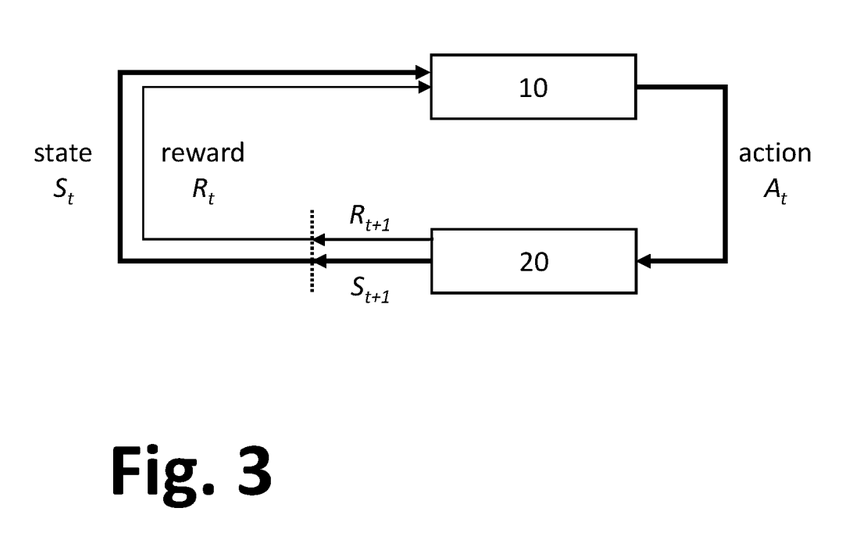
FIG. 3 shows in a schematic illustration of an overview about an exemplary Reinforcement Learning (RL) algorithm of the artificial intelligence agent (or AI agent) according to an embodiment of the invention.

FIG. 3 shows in a schematic illustration an overview about a Reinforcement Learning (RL) algorithm of the AI agent 10. The AI agent 10 can comprises a Reinforcement Learning algorithm, which can use rewards and punishments as signals for positive and negative behavior. It can be developed and installed on a server (local or cloud) and can be part of the emergency call center 40 (e.g., a PSAP). The algorithm can be based on an action-reward feedback loop as it is presented below:

The basic terms of the algorithm for the AI Agent can include:
a) The emergency environment 20.
b) The states. There are at least 4 different states for the algorithm (e.g. there can be only four states in some embodiments, there can be additional states in other embodiments, etc.):
  i. $S_0$: Standby state when no call is placed in the queue.
  ii. $S_1$: Calculation of call waiting time until an operator answers the call.
  iii. $S_2$: Calculation of the response time until the responders 30 arrive at the emergency scene.
  iv. Action state. Forwarding the emergency call or distributing a message (or both) to the emergency responders, including important data (location of calls, type of calls, keywords parsed by chatbot, incoming call rate towards the emergency call center
c) The reward.

In this specific embodiment, a Markov Decision Process (MDP) mathematical framework can be used to describe the functioning of the algorithm, since it incorporates a set of finite environment states (S), a set of values (V) based on the algorithm's actions (A) and a reward process (R). The mathematical equation that can summarize the MDP is the following:

$$V(s) = \sum_t \gamma^t R(s_t)$$

Where:
V(s): Is the value stored after every action on every step and after a reward is given after that step.
R: The rewards given after every step.
St: The value of every step. In this case it can be the calculation of (a) the call waiting time until a call is serviced by an operator, or (b) the calculation of the response time needed for the responders 30 to arrive at the scene or (c) both.
γ: is a universal discount rate, which takes values between 0 and 1. It is always less than 1, so events in the distant future are weighted less than events in the immediate future.

After each of its actions, the AI agent 10, is rewarded by the emergency environment 20. The reward is automatically calculated using a computer implemented method which identifies how well the algorithm responds to the various events based on the (a) call waiting time before a call is serviced by a call taker, or (b) on the time needed for the responders 30 to arrive at the scene, or (c) both.

The expression that can justify the reward process can be:

$$R = 1/t$$

Where:
R: is the reward
t: is the time (in seconds) described in (a), (b) or (c) above.

The less the time, the higher the reward score for the AI agent 10. $S_0$, the AI agent will always try to score the highest number possible.

For Example:
If the call waiting time is 2 minutes (120 secs) the reward will be R=1/120=0.008 but if the call waiting time is 1 minute (60 secs) the reward will be R=1/60=0.01, which is by far better. The same is applicable for the response time from the responders 30 or the combination of times. The less the time, the bigger the reward score (R) for the AI agent 10.

It should be noted that the term "comprising" does not exclude other elements or steps and the "a" or "an" does not exclude a plurality. Further, elements described in association with different embodiments may be combined.

It should also be noted that reference signs in the claims shall not be construed as limiting the scope of the claims.

It should also be appreciated that different embodiments of the method, communication system, and communication apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, terminal device, a network, a server, a communication system, and methods of making and using the same have been shown and described above, it is to be distinctly understood that the invention is not limited thereto but may be otherwise variously embodied and practiced within the scope of the following claims.

What is claimed is:

1. A computer-implemented method for response time reduction in emergency incident events comprising:
  monitoring, by an artificial intelligent agent (AI Agent), an emergency environment in real time upon an occurrence or change in one or more emergency incident information values;
  the AI Agent analyzing whether the one or more emergency incident information values occurs and/or reaches across one or more predefined thresholds;
  the AI Agent ad-hoc dispatching one or more first responders in response to the analysis revealing that dispatching of the one or more first responders is needed;
  rewarding the AI Agent with a reward based on the AI Agent's performance of the monitoring and/or the ad-hoc dispatching;
  the AI Agent adjusting the one or more predefined thresholds based on the reward.

2. The computer-implemented method of claim 1, wherein the AI Agent is defined in a non-transitory medium that is communicatively connectable to a processor of a communication device or a computer device.

3. The computer-implemented method of claim 2, wherein the monitoring of the emergency environment comprises identifying, by the AI Agent all incoming calls, queued calls and/or media data of one or more callers in one or more emergency call centers and/or wherein the monitoring of the emergency environment further comprises identifying, by the AI Agent, a location and/or type of the incoming calls, the queued calls and/or the media data.

4. The computer-implemented method of claim 3, wherein the monitoring of the emergency environment comprises clustering, by the AI Agent, several calls from a specific location or a sub-location and/or rating, by the AI Agent, several calls which are used to give information about a scale of an incident.

5. The computer-implemented method of claim 4, wherein the clustering further comprising automatically setting, by the AI Agent, a radius determining a special location according to at least one of a predefined incident identification, accessibility for rescue forces, network coverage in mobile and/or wired call networks, geophysical location, road and street network, traffic volume, occurrence of special events and/or weather events.

6. The computer-implemented method of claim 1, wherein the analyzing of the monitored emergency environment comprises identifying, by the AI Agent, keywords or key noises in ambient noise from the one or more callers whose call is waiting in a queue and matching identified keywords and/or key noises to predefined keywords and/or predefined key noises.

7. The computer-implemented method of claim 1, wherein the analyzing of the monitored emergency environment comprises prompting, by the AI Agent, one or more callers whose call is waiting in a queue to give a description of the emergency incident and/or scanning, by the AI Agent, a conversation from the one or more callers who is giving a description of the emergency incident for specific keywords and/or key noises.

8. The computer-implemented method of claim 1, comprising:
using, by the AI Agent, a speech-to-text analysis to create a transcript of the description of the emergency incident that the one or more callers gives to identify keywords.

9. The computer-implemented method of claim 1, wherein the analyzing of the monitored emergency environment comprises identifying, by the AI Agent, a number of calls in a queue and/or a waiting time for each call in the queue to be answered.

10. The computer-implemented method of claim 1, wherein the analyzing of the monitored emergency environment comprises identifying, by the AI Agent, a call status of one or more call takers in a call center and/or a call status of each of the one or more first responders.

11. The computer-implemented method of claim 1, wherein the analyzing of the monitored emergency environment comprises automatically prompting, by the AI Agent, the one or more callers and/or automatically scanning, by the AI Agent, ongoing conversations, reports of conversations and/or ambient noise of calls in a queue upon keywords and/or key noises when there are minimum of N calls waiting in the queue to be answered from the same area and on the same time.

12. The computer-implemented method of claim 1, wherein the ad-hoc dispatching comprises sending, by the AI Agent, a message with all necessary information to each of the appropriate one or more first responders that need to be involved in the emergency incident.

13. The computer-implemented method of claim 1, wherein the ad-hoc dispatching comprises simultaneous dispatching, by the AI Agent, of different one or more first responders and/or different emergency departments.

14. The computer-implemented method of claim 1, wherein the analyzing of the monitored emergency environment comprises identifying, by the AI Agent, an area or building with precedence in combination with a specific keyword or key noise, and the ad-hoc dispatching of the one or more first responders or emergency departments which are necessary according to the identified area or building is performed with precedence in combination with the specific keyword or key noise without waiting for more calls to converse with the AI Agent and without further information about the emergency incident.

15. The computer-implemented method of claim 1, wherein the step of rewarding comprises measuring, by the AI Agent, a call waiting time, which is a time until an incoming call is answered by one or more call takers or one or more first responders and/or measuring, by the AI Agent, the response time which is a time for first responders to arrive on the emergency incident scene.

16. A system for response time reduction in emergency incident events, comprising:
a computer device having a processor connectable to a non-transitory memory that has code stored thereon that defines an artificial intelligence agent (AI Agent), the processor configured to run the code such that the computer device performs:
monitoring of an emergency environment in real time upon an occurrence or change in one or more emergency incident information values;
analyzing whether the one or more emergency incident information values occurs and/or reaches across one or more predefined thresholds;
ad-hoc dispatching one or more first responders in response to the analysis revealing that dispatching of the one or more first responders is needed;
rewarding the AI Agent with a reward based on a performance of the monitoring and/or the ad-hoc dispatching; and
adjusting the one or more predefined thresholds based on the reward.

* * * * *